United States Patent [19]
Wendel et al.

[11] Patent Number: 5,655,561
[45] Date of Patent: Aug. 12, 1997

[54] WIRELESS SYSTEM FOR DETECTING AND STOPPING WATER LEAKS

[76] Inventors: A. Christopher Wendel, 7169 154th Rd. North, Palm Beach Gardens, Fla. 33418; Steven E. Freitag, 1598 Glendale Ave. NW., Palm Bay, Fla. 32907

[21] Appl. No.: 561,828

[22] Filed: Nov. 27, 1995

[51] Int. Cl.$^6$ ................................................. G08B 21/00
[52] U.S. Cl. ...................... 137/79; 137/59; 137/78.1; 137/312; 340/605
[58] Field of Search ................ 137/79, 312, 624.12, 137/334, 78.1, 59; 340/605

[56] References Cited

U.S. PATENT DOCUMENTS

| | | | |
|---|---|---|---|
| 4,297,686 | 10/1981 | Tom | 137/78.1 |
| 4,324,268 | 4/1982 | Jacobson | 137/312 |
| 5,008,650 | 4/1991 | Hoilberg | 340/605 |
| 5,139,044 | 8/1992 | Otten et al. | 137/80 |
| 5,240,022 | 8/1993 | Franklin | 137/312 |
| 5,240,028 | 8/1993 | Hoch, Jr. et al. | 137/80 |
| 5,305,791 | 4/1994 | Kowalchuk | 251/129.04 |
| 5,345,224 | 9/1994 | Brown | 340/605 |
| 5,402,815 | 4/1995 | Hoch, Jr. et al. | 137/312 |

FOREIGN PATENT DOCUMENTS

06108502  4/1994  Japan ........................ 137/59

Primary Examiner—A. Michael Chambers
Attorney, Agent, or Firm—Norman Friedland

[57] ABSTRACT

A water-activated alarm system, providing an alarm in the event of a water leak, includes a radio-frequency transmitting unit and a receiving unit and a number of safety features to ensure proper operation in the event of an emergency. The transmitting unit includes a flood detector having electrodes to be placed in a flood prone area, a tone encoder, for sending an encoded signal in the event of a flood, and means to provide visible and audible alarm indications, including a buzzer and a user-programmable digital voice circuit for identification of the area in which a flood occurs. The receiving unit includes a superheterodyne receiver or a super-regenerative receiver and detector, a tone decoder to prevent false alarms, a battery charger, a solenoid valve for shutting off the flow of water in the event to a leak detected by the transmitting unit, and a freeze-guard circuit using a peltier device to keep the solenoid valve within a temperature range allowing valve operation during freezing weather conditions.

21 Claims, 4 Drawing Sheets

WIRELESS SYSTEM FOR DETECTING AND STOPPING WATER LEAKS

BACKGROUND OF THE INVENTION

1. Field of the Invention

This invention relates to a system for detecting water leaks and for closing a valve to shut off a water supply in the event of a leak, and more particularly to a system including a number of battery-powered leak detectors connected by a radio link to a receiver closing the valve.

2. Background Information

A typical structure, such as a house or commercial building, has a single input pipe through which water is supplied to a network of pipes carrying the water to various faucets and appliances. Alternately, a single structure may be divided into a number of dwellings or commercial areas, each of which has a single water input pipe supplying a network of pipes. In either case water leaks may develop in a number of locations, despite the fact that water comes into the structure or individual area through a single source, the input pipe. If a leak develops and is not detected, severe property damage generally results from the water which accumulates, since the water source continues to supply water which escapes through the leak. Furthermore, a personal safety problem arises when the water forms a slipping hazard on the floor, or if the water comes into contact with primary electrical wiring, such as wiring carrying 110 volts AC.

Water leaks are caused by failures within the appliances connected to the network of pipes or by failures within the network of pipes itself. Appliances prone to such failures include water heaters, washing machines, refrigerators with icemaking mechanisms, pipes or hoses associated with such appliances, and toilet flushing mechanisms. Failures within the network are often caused by ambient conditions which cause the water in certain pipes, such as pipes extending through or along poorly-insulated outside walls, to freeze, bursting the pipes. Serious flooding is also often caused by inadvertently leaving a faucet in a sink or tub running with the associated drain(s) blocked.

Thus, while there are a number of places where water leaks can be expected to occur, the locations where sensors must be placed to determine when such leaks may occur can generally be predetermined. For example, such sensors should be placed near or under appliances likely to develop leaking conditions, under pipes extending through or near exterior walls likely to promote freezing conditions, and at low points in bathrooms where sinks and tubs may be left with water running. While the locations of potential leaks can be determined, some of these locations, such as the places where pipes run through or near exterior walls, are not easily accessed. Such locations may, for example, by in crawl spaces under floors. Any sensing unit placed in such a location cannot easily be serviced with line current, such as 110 volts AC. Any visual indication given directly by a sensing unit in such a location will probably not be noticed. While an audio indication, such as a buzzer, given directly by a sensing unit in such a location may be heard, its meaning, including the location of the unit, may be difficult to determine, and a leak may occur in a building when no one is inside. Furthermore, the input pipe, through which water is brought into the structure, is typically in a location which is not easily accessed. While a solenoid valve in this location can effectively be used to shut off the flow of water, visual and audible indications in this location may not be noticed or understood.

Thus, a system for detecting leaks and for providing an alarm when they occur should include sensors capable of placement in remote locations not having line current. Visible indications, such as alarm lights, should be placed both at the sensing unit and at the solenoid valve. Audible indications should also be placed both at the sensing unit and at the solenoid valve, and should be differentiated, one from another, so that the source of a leak can be determined even if the leaks and sensing units are not accessible.

Since the conditions which cause water leaks, such as extremely low outside temperatures, often also cause the interruption of electrical power, it is particularly desirable that such a system should operate properly without line power, using batteries for energy storage.

The potential danger of having electrical wiring attached to the power lines in locations of standing water is well known. While this danger can be alleviated by proper design measures, such as watertight enclosures and circuits providing electrical isolation, a particularly simple and effective way to avoid this danger is the use of battery power without electrical line power to operate all sensor units. What is therefore needed is a system having a number of sensors operating on individual batteries.

The most serious water leaks, in terms of property damage, are typically leaks which occur in unattended conditions. It is therefore highly desirable that a system capable of recognizing water leaks and providing alarms should also be capable of taking action to shut off the water at an input pipe so that further damage is prevented.

DESCRIPTION OF THE PRIOR ART

U.S. Pat. No. 5,240,022 to Franklin describes an automatic system for shutting off the flow of water through a valve upon the detection of a water leak. The valve is controlled by a microprocessor which includes self test features. In a first version of the system, a number of "slave" sensor units detecting water leaks at various locations is "hard wired" to the "master" unit operating the valve. That is, wiring carries electrical power to the slave units and signals from the slave units to the master unit. In a second version of the system, electrical power for the slave units is provided over the AC line, but signals from the slave units are sent back to the master unit by means of a line-carrier signal sent along the AC line, or by means of the transmission of radio-frequency signals through the air.

While Franklin mentions the use of battery power, the leak detection circuit includes a microprocessor which must be constantly operating whenever leaks are to be detected. What is needed is a system having sensors not wired to the AC line or to one another. For maximum battery life, which is particularly important if sensing units are to be placed in inaccessible locations, what is needed is a leak detection system that does not produce a drain on the battery when a leak is not present. While Franklin provides both audible and visible alarms at each sensor, the visible alarm may not be visible under actual usage conditions, and the audible alarm is only a buzzing sound from a piezoelectric transducer, which does not identify which sensor unit has detected a water leak. What is needed is a sensor producing a unique, self-identifying audible alarm.

U.S. Pat. No. 4,324,268 to Jacobson describes an automatic flood control valve apparatus having a normally open valve in combination with a latching relay for closing the valve, which latches the valve in a closed position when the relay is energized and until it is manually reset, and a single transistor sensor circuit for energizing the relay in response to a water leak. A pair of sensing electrodes is extended in two directions to detect water leaks adjacent to two different appliances. Electrical power is shown as coming only from the AC lines. However, this method requires hard wired connections to each area in which leaks are to be sensed. In general, many of such locations cannot be easily reached with wiring. Furthermore, when a water leak is detected, this method lacks a way to determine which location is affected. Again, what is needed is a system providing for battery operation of sensor units connected by radio transmissions, together with a method for identifying the source of a water leak detection. Furthermore, what is needed is a solenoid valve which is mechanically stable in either an open or closed position, so that a loss of electrical power, which is likely to occur in the event of a water leak, cannot allow the valve to re-open.

The patent literature also describes a number of systems configured to sense a water leak in a single area and to turn off a source of water to the device causing the spill. U.S. Pat. No. 4,845,472 to Gorden et al. describes the use of a single sensor at the low point of a basement, with the input water pipe being shut off by a valve. U.S. Pat. No. 5,344,973 to Furr and U.S. Pat. No. 5,345,224 to Brown describe leak detection systems configured for use with water heaters. U.S. Pat. No. 5,357,241 to Welsh, Jr. et al. describes a system for use with either the water tank of a hot water heater or the water tank of a toilet. When a leak is detected, a first valve is closed to prevent the flow of additional water into the tank, and a second valve is opened to drain water from the tank. Since water leaks can occur in so many places within a typical structure, what is needed is a system having a single valve to shut off the water, operated when a leak is detected at one of a number of different sensor locations.

SUMMARY OF THE INVENTION

In accordance with one aspect of the invention, there is provided a leak detection transmitter including a housing, a battery with first and second battery terminals within the housing, first and second electrodes extending from the housing, and a radio-frequency transmitter within the housing. The first electrode is electrically connected to the first battery terminal, and the electrodes extend adjacent to one another so that electrical conductivity occurs between the electrodes when a partially conductive fluid extends between the electrodes. The radio-frequency transmitter transmits an encoded signal through the surrounding atmosphere in response to an electrical potential established between the second electrode and the second battery terminal, with electrical power for the operation of the radio-frequency transmitter being derived from the battery.

In accordance with another aspect of the invention, there is provided a leak detection system including a number of leak detection transmitters and a leak detection receiver. Each leak detection transmitter has a detection mechanism to detect a nearby water leak, which produces a first intermediate signal when such a leak is detected. Each leak detection transmitter also includes a message storage mechanism for storing an individual audio message, a message playback mechanism for playing back the message in an audible manner, and a transmission mechanism for transmitting an alarm signal. Both the message storage mechanism and the transmission mechanism operate in response to the first intermediate signal. The leak detection receiver includes a receiving mechanism for receiving the alarm signal from each of the leak detection transmitters. The receiving mechanism produces a second intermediate signal when the alarm signal is received. The leak detection receiver also includes a valve operating in response to the second intermediate signal to shut off water flow.

DETAILED DESCRIPTION

Figure 1:
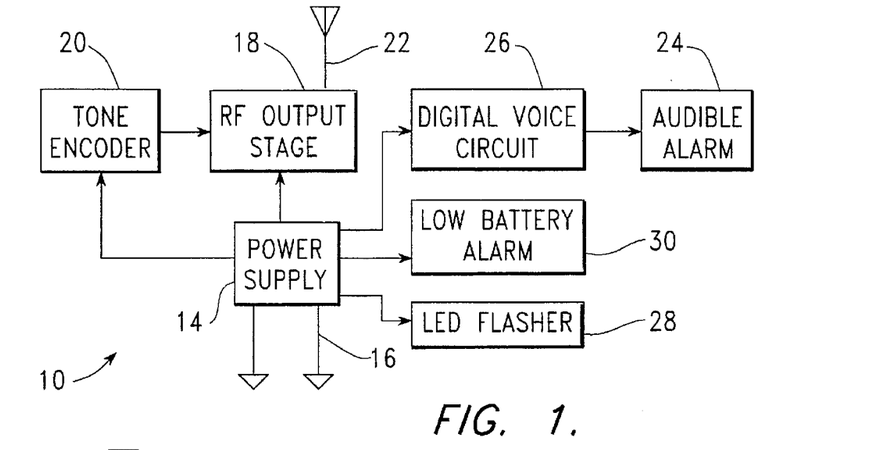
FIG. 1 is a block diagram of a transmitting unit forming part of an alarm system built in accordance with the present invention.

FIG. 1 is a block diagram of a transmitting unit 10, forming part of an alarm system built in accordance with a preferred embodiment of the present invention, which is operated with power derived from a battery forming part of power supply 14 to provide isolation from power surges and outages which may result from a water leak.

When transmitting unit 10 is installed for operation, a pair of electrodes 16, extending from power supply 14 are placed, in close proximity to one another, within an area which is considered likely to accumulate water in the event of a water leak. Power supply 14 is preferably of a type which provides a voltage, necessary to the operation of associated devices, only when water has accumulated to an extent promoting electrical conductivity between electrodes 16. Thus, an accumulation of water causes RF (radio frequency) stage to turn on as a voltage output of power supply 14 becomes present. The RF signal generated within RF Output Stage 18 is modulated with a tone signal generated within tone encoder 20 in order to drive antenna 22 with a signal which cannot easily be mistaken.

When power supply 14 is thus turned on to provide this voltage, an audible alarm circuit 24 begins producing an alarm consisting of alternating segments of a buzzing signal and a voice signal digitally recorded by the user of the system within digital voice circuit 26. If several transmitting units 10 are deployed within a single structure, this feature can be used to reveal the location at which a water leak has been detected. When this necessary voltage is turned on, a blue LED (light-emitting diode) flasher 28 turns on, providing a visible indication of a detected leak. Thus, while the voice signal is used to provide information particularly locating the water leak which is occurring, the buzzer produces a shrill sound to gain attention to the problem.

Transmitting unit 10 also includes a low-battery alarm circuit 30, which improves the reliability of the system by giving an indication when battery replacement is necessary.

Transmitting unit 10 provides the alarm system with a particular advantage of using battery power alone, eliminating the potential hazard of placing electrical circuits connected to the power lines within areas prone to flooding.

Figure 2:
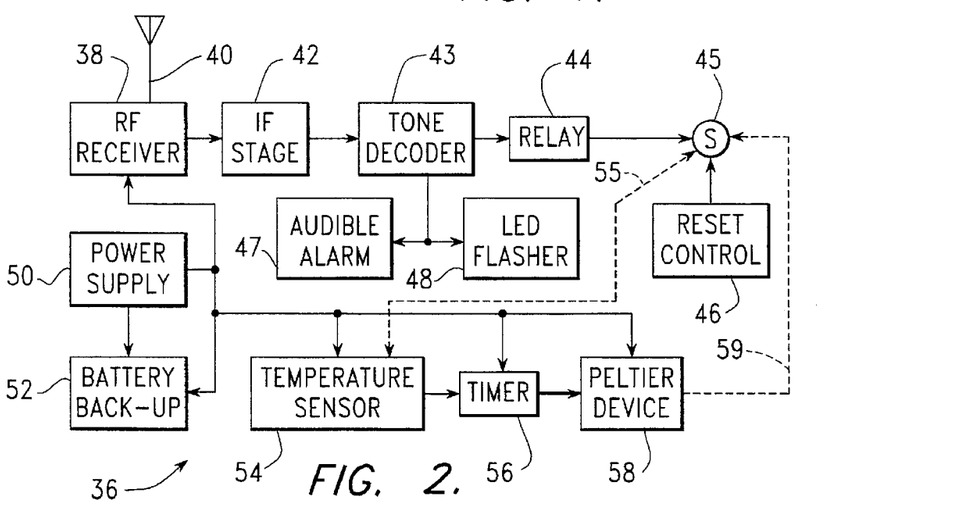
FIG. 2 is a block diagram of a receiving unit forming, along with the transmitting unit of FIG. 1, an alarm system built in accordance with the present invention.

FIG. 2 is a block diagram of a receiving unit 36 forming a second portion of an alarm system built in accordance with the preferred embodiment of the present invention. This receiving unit 36, which is configured and tuned, particularly for receiving and detecting the radio signal sent from transmitting unit 10, includes a superheterodyne receiver, having an RF receiver 38 which receives this signal through an antenna 40, an IF (intermediate frequency) stage 42, and a tone decoder 43 which detects the particular tone provided as an output from tone encoder 20 of transmitting unit 10. When this tone is detected, relay 44 is operated to close a solenoid valve 45. After the solenoid valve is closed in this way, it can be opened by the manual operation of a reset control 46. The output of tone decoder 43 is also used to operate an audible alarm 47 and an LED flasher 48.

The various circuits within receiving unit 38 are powered by a power supply 50, which in turn receives power from a standard electrical circuit having, for example, 120 volts alternating current, and from a battery 52, which allows operation of the unit 38 in the event of a power failure. The power supply 50 also provides a trickle current to keep battery 52 charged.

The receiving unit 36 preferably includes means for preventing the solenoid valve 45 from being frozen in an open position as the temperature of water within the valve 45 drops below the freezing level. A temperature sensor 54 determines when the case of solenoid valve 45 drops to a level near freezing. (The thermal connection between solenoid valve 45 and temperature sensor 54 is indicated by a dashed line 55.) When this occurs, the sensor 54 turns a timer 56 on, so that a peltier device 58 is cycled on and off through a pre-determined timing sequence. This device 58 is preferably mounted outside the case of solenoid valve 45, so that heat is easily transferred from the peltier device 58 to the solenoid valve 45 (as indicated by a dashed line 59). Other methods for applying electrically generated heat, such as various types of resistive elements or resistive tapes may be used in place of the peltier device 58. In this way, it is ensured that the solenoid valve 45 can be operated to shut off the water supply in the event that a frozen water pipe is burst, as sensed by the subsequent release of water in the region of electrodes 16 (shown in FIG. 1). Thus, receiving unit 36 provides a particular advantage, when compared to the prior art systems, of preventing the solenoid valve from becoming frozen open with lowering temperatures. The various portions of solenoid valve 45 may be composed, for example, of brass, aluminum, or stainless steel, with the metallic materials being favored for thermal conductivity from the peltier device 58.

Figure 3:
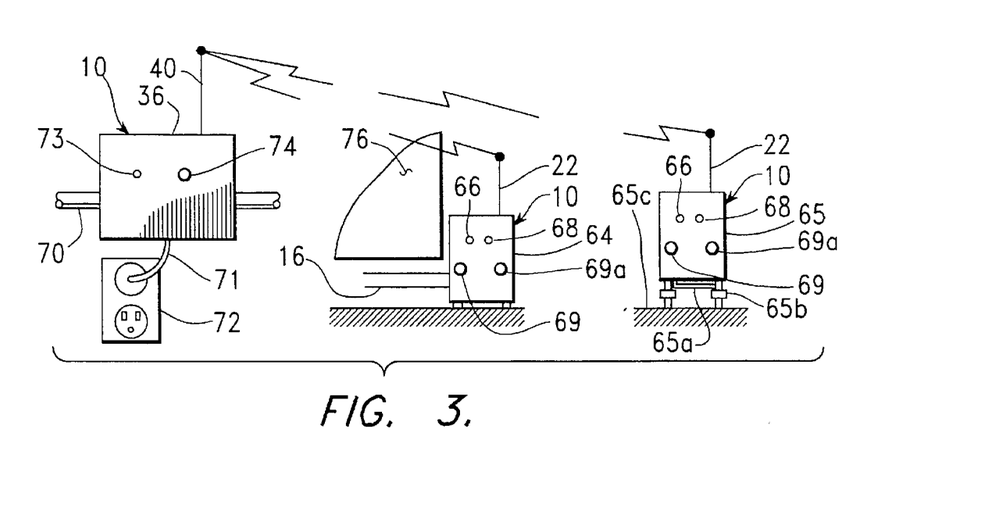
FIG. 3 is a fragmentary elevational view of a system including two of the transmitting units of FIG. 1 and one of the receiving units of FIG. 2.

FIG. 3 is a fragmentary elevational view of a flood alarm system including a first transmitting unit 10, a second transmitting unit 63 and a single receiving unit 36. The circuits of transmitting unit 10 are housed within a watertight enclosure 64, from which the water sensing electrodes 16 and the antenna 22 extend. The circuits of transmitting unit 63 are housed within a watertight enclosure 65, having, along a lower surface, water sensing electrodes 65a. Transmitting unit 63 also includes adjustable feet 65b, which can be rotated to determine the distance between electrodes 65a and the adjacent floor surface 65c.

A blue LED 66, operated by LED flasher unit 28 (shown in FIG. 1), and a red LED 68, operated by low battery alarm circuit 30 (also shown in FIG. 1), are visible from the front of the transmitting unit 10, providing visible indications of a detected flood condition and a battery-low condition, respectively.

Each transmitting unit 10 also includes a record pushbutton switch 69, which is depressed to place the unit in a mode recording audio information. With the button of this switch 69 is depressed, the user may record a message saying, for example, that a water leak has occurred in the particular location where he is placing the unit. With both pushbuttons 69 and 69a released, the message is played back only when a water leak is detected. This feature provides for the communication of this information in the event of a water leak, even if the unit is placed where it, with its LED 66, cannot be seen.

A message recorded in this manner may subsequently be played back when the button of a test pushbutton switch 69a, which is also placed on each transmitting unit 10, is depressed. This test pushbutton switch 69a also causes a buzzer within the transmitting unit to be activated following the playback of the recorded message, as it would be in the event of a detected water leak. Thus, test pushbutton switch 69a is used to review the content of the audio message, and to determine if the battery and circuits are properly functional. This feature may be used to find the transmitting unit 10 with a completely drained battery, in the event that a water leak occurs and is stopped by closing the solenoid valve 45 (shown in FIG. 2), while the owners of the property are away, so that evidence of the leak is gone when they return. If enough time elapses with the transmitting unit 10 providing its warning signal, the battery within the transmitting unit 10 is discharged to a point at which the low battery alarm through red LED 68 cannot be displayed. Under such conditions, the transmitting units 10 not effected by the leak do not have fully discharged batteries, while the transmitting unit 10 effected by the leak has a fully discharged battery, as determined by the fact that the audio message and buzzing functions do not occur when the button of its test switch 69a is depressed.

The circuits of receiving unit 10 are mounted within a box 36, which is mounted on solenoid valve 45 (shown in FIG. 2) installed in a water line 70. Electrical power for power supply 50 (also shown in FIG. 2) is brought into the unit 36 through a line cord 71 extending to an electrical outlet 72. The antenna 40 extends from box 36, forming part of a radio link between the transmitting units 10 and the receiving unit 36. Receiving unit 36 also includes an LED 73, which is illuminated along with the closing of solenoid valve 45 upon the detection of a water leak, and a pushbutton reset switch 74, which is depressed to open the solenoid valve 45 after it has been closed. The various circuits of receiving unit 36 may alternately be placed in a receiver housing (not shown) separate from solenoid valve 45, with a cable extending between the receiver housing and the solenoid valve, including wires to operate the solenoid valve and the peltier device, and to carry a temperature signal from the solenoid valve and the circuits within the receiver housing.

In this way, the flood protection needs of a typical structure, having a single source of water but many places where leaks can occur with water from that source, are easily met. The solenoid valve 45 (shown in FIG. 2) is preferably placed within the structure near the point at which the water supply pipe 70 enters the structure, and the transmitting units 10 are preferably placed at the various points where leaks may occur, or where water is expected to accumulate if leaks occur. For example, the electrodes 16 from a transmitting unit 10 may extend under an appliance 76 in which a leak may develop, such as a water heater or a refrigerator having an ice maker with an attached water line. Transmitting unit 63 may be placed on the floor 65c at a low point, where water is expected to accumulate in the event of a water leak.

Other places to consider for the placement of transmitting units include any locations where water pipes run through or near exterior walls, since such pipes may be subject to freezing in the event of extremely low temperatures.

The radio link established between the transmitting units 10 and the receiving unit 36 makes it particularly easy to install a number of transmitting units at such points of potential leakage and water accumulation. The units 10 may be easily placed at such points throughout the structure without wiring.

Figure 4:
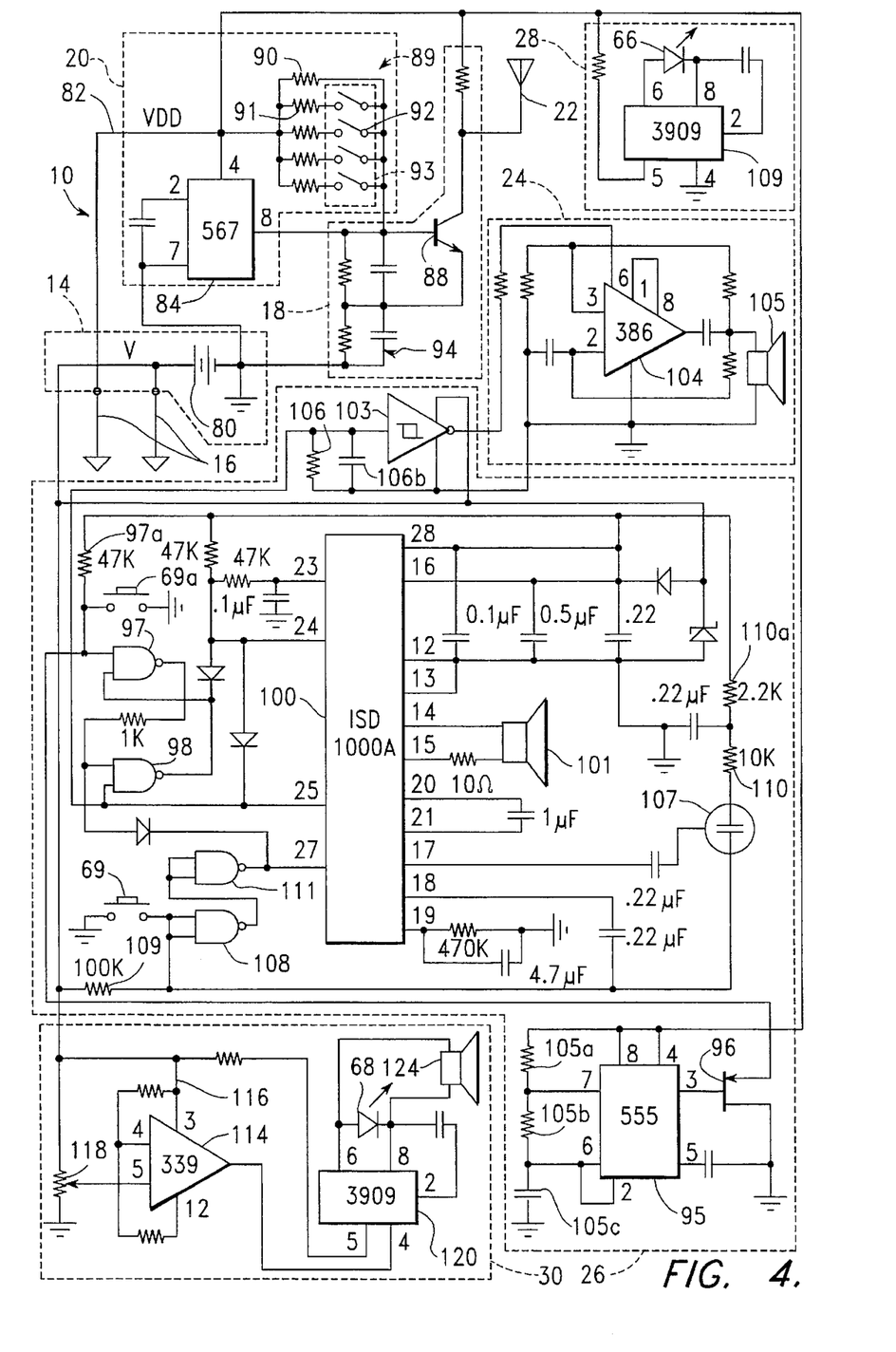
FIG. 4 is a schematic diagram of the transmitting unit of FIG. 1.

FIG. 4 is a schematic view of the transmitting unit 10. Operation of the alarm functions is begun when leaked water forms an electrical connection between the two electrodes 16 extending from power supply 14, so that the 9-volt potential of battery 80 above an internal electrical ground is applied to line 82 as VDD. This application of voltage turns on RF output stage 18, tone encoder 20, digital voice circuit 26 and LED flasher circuit 28.

An audio tone identifying the particular alarm system of which the transmitter 10 belongs is generated by tone encoder 20, including a phase-locked loop (PLL) circuit 84, which may be, for example, an LM567 phase locked loop, using an internal voltage controlled oscillator (VCO) to produce a stable tone provided as an output on line 86. This output line 86 is used to drive the base of a transistor 88 forming part of RF output stage 18. A variable resistance 89 is used to adjust the frequency of this tone. This variable resistor 89 may consist, for example, of a fixed resistance 90 having a maximum value associated with the desired operating conditions of PLL circuit 84, together with a number of selectable resistors 91 connected through switch contacts 92 of a DIP switch module 93. These DIP switches are made accessible to the user, so that he may position them to determine the tone frequency of his transmitter.

The output of PLL circuit 84 is provided as an input to RF output circuit 18, at the base of RF output transistor 88, which may be, for example, a 2N2222 transistor, NPN-AF/RF. The base of output transistor 88 is also connected to a tank circuit 94, composed of resistors and capacitors arranged to oscillate at the frequency to be established for a carrier signal, which is preferably 72 MHz (Megahertz), taking advantage of an output power level of one watt authorized at this frequency by the Federal Communications Commission. Otherwise, the transmitter can be configured to operate at a frequency between 27 and 80 MHz, at a maximum output power of 0.1 watt. Thus, whenever VDD is present, the switching of transistor 88 drives antenna 22 to generate the RF signal according to a pre-established frequency pattern. The use of battery-powered transmitters in this way is particularly advantageous since all of the transmitter circuits are powered using VDD, which is only present under the conditions of a spill causing conductivity between the electrodes 16. Thus, when such a spill is not present, the transmitter circuits do not cause a current drain on the battery 80.

Digital voice circuit 26 is also turned on by the activation of the voltage VDD, which is applied through the connection of line 82 to input pins 4 and 8 of timer 95, which may be, for example, an LM555 integrated circuit configured as an astable multivibrator. The output of timer 95, on pin 3, is connected to the gate of MOSFET transistor 96, so that an input to NAND gate 97 is pulled to electrical ground when timer 95 turns on. When this input is not pulled to ground, it is held high through a pull-up resistor 97a. NAND gates 97 and 98 are configured as a flip-flop which is set as the input to voice circuit 100, pins 23 and 24, NAND gate 97 is driven low through MOSFET transistor 96, and which is reset when the 555 timer, 95, times-out removing the hi at pin 3. The output of voice integrated circuit 100 on pin 25 drives an input to NAND gate 98 low. Voice integrated circuit 100 may be, for example, an ISD-1000A digital voice record/playback integrated circuit from Information Storage Devices, having electrical ground connections to pins 1–6, 9, and 10. This circuit 100 drives a speaker 101 with an audio message which has been previously stored by the system user. This message may, for example, say that a water leak has been detected at a certain location, identifying the location at which the transmitting unit 10 has been placed.

The playback function of digital voice integrated circuit 100 is initiated when the input to pin 27 is driven high by the output of NAND gate 97, and as the input to pin 23 is driven low by the output of NAND gate 98. The playback function is ended when the message is completed, as indicated by a low End of Message signal provided by voice integrated circuit 100 on pin 25. This signal resets the flip-flop composed of NAND gates 97 and 98, and provides a low input to a Schmitt trigger invertor 103. The output of invertor 103 turns on an amplifier 104, which may be, for example, an LM386 audio frequency power amplifier, forming part of the audible alarm circuit 24, driving a buzzer 105. Audible alarm circuit 24 is used in this way to gain the attention of someone not listening particularly for the playback of audio information.

The timing of these voice message playback and audible alarm functions is determined by resistance and capacitance values associated with the timer circuit 95, by the length of the audio message stored in voice integrated circuit 100, and by the resistance and capacitance values associated with invertor 103. For example, resistors 105a and 105b, and capacitor 105c, may be configured so that, whenever the input of voltage VDD on pins 4 and 8 is present, timer circuit 95 provides an output to the gate of CMOSFET transistor 96 for two seconds every 100 seconds. In this way, the flip-flop composed of NAND gates 97 and 98 is set every two seconds, to be reset by the End of Message signal when the voice message is completed, with the voice message being repeated every 100 seconds. Resistor 106 and capacitor 106a are configured so that buzzer 105 is operated for a predetermined time, such as two seconds, following each repetition of the voice message.

In the absence of the voltage VDD, i.e. when a water leak is not detected, the sequence of playing back the voice message, followed by the operation of buzzer 105, is started by depressing the button of switch 69a, so that an input to NAND gate 97 is brought low, simulating conduction through transistor 96. This feature is used to verify the content of the voice message, and to check the operation of the unit, including its battery. Within the digital voice circuit 26, power inputs, such as the inputs applied through pins 16 and 28 of voice integrated circuit 100, the power input applied to invertor 103, and the voltage at pull-up resistor 97a, are supplied at the battery voltage V, to be present whether or not a leak is detected, so that proper operation occurs with the depression of the pushbutton of switch 69a, in the absence of a VDD.

Before digital voice integrated circuit 100 can be used in this way, the desired message must be recorded by the user. A message is recorded within voice integrated circuit 100 as it is spoken into an electret condenser microphone 107 with the button of record 69 depressed to ground both inputs of a NAND gate 108, which are otherwise held at the battery voltage V through a pull-up resistor 109. The depression of the pushbutton of switch 69 also enables operation of the microphone 107 by placing electrical ground on one of the microphone terminals, so that the battery voltage V is applied across the microphone 107 through a series resistors 110 and 110a. The output of NAND gate 108 provides both inputs of a NAND gate 111, driving input pin 27 of voice integrated circuit 100 low, so that the circuit 100 is placed in a record mode. If necessary, the message may be changed by recording a new message over an existing message.

The four NAND gates 97, 98, 108, and 111 may be, for example, CD-4095 CMOS quad two-input NAND Schmitt triggers.

After a message is recorded, it may be played back by depressing the button of switch 69a, as described above. If the recorded message needs correction, another message may be recorded over it. The audio message is stored in non-volatile memory within voice integrated circuit 100, eliminating a need to provide a low-level current for storing the message.

This capability provides the system with significant advantages over prior-art leak detection systems, which do not include an audio message capability. Because the audio message is programmable by the user of the system, it can be tailored to describe the location in which the transmitter is placed, and changed if the transmitter is moved to a new location. The message may contain additional information, such as a phone number of a plumber or of a person taking care of the property. This type of information is particularly valuable if a leak is detected when the owner is away from the property. Thus, the location of the leak is provided by the audio message, along with information and directions for immediate action and for resolution of the problem in accordance with the wishes of the property owner.

The LED flasher circuit 28 is also turned on when VDD is present, through a connection between line 82 and a voltage input of a flasher circuit 112, which may be, for example, an LM3909 LED Flasher/Oscillator. This flasher circuit 112 flashes a blue LED 66, providing a visual indication that a water leak has been detected. Since this circuit 112 is turned on only by VDD, it does not use battery power when a leak has not been detected.

The battery voltage V is also supplied to a comparator 114 as a voltage input on line 116 and as a signal level through a voltage-dividing potentiometer 118. Comparator 114, which may be, for example, an LM339 quad comparator, forms part of the low battery alarm circuit 30. When the voltage applied to comparitor 114 through potentiometer 118 reaches a pre-determined level, the comparator 114 drives a flasher circuit 120, which drives a red LED 68, giving a visible indication of a low battery condition, together with a buzzer 124, giving an audible indication of this condition. Like flasher circuit 112, flasher circuit 120 may be, for example, an LM3909 LED flasher/oscillator. The battery voltage level at which these indications occur may be adjusted by adjusting potentiometer 118.

Figure 5:
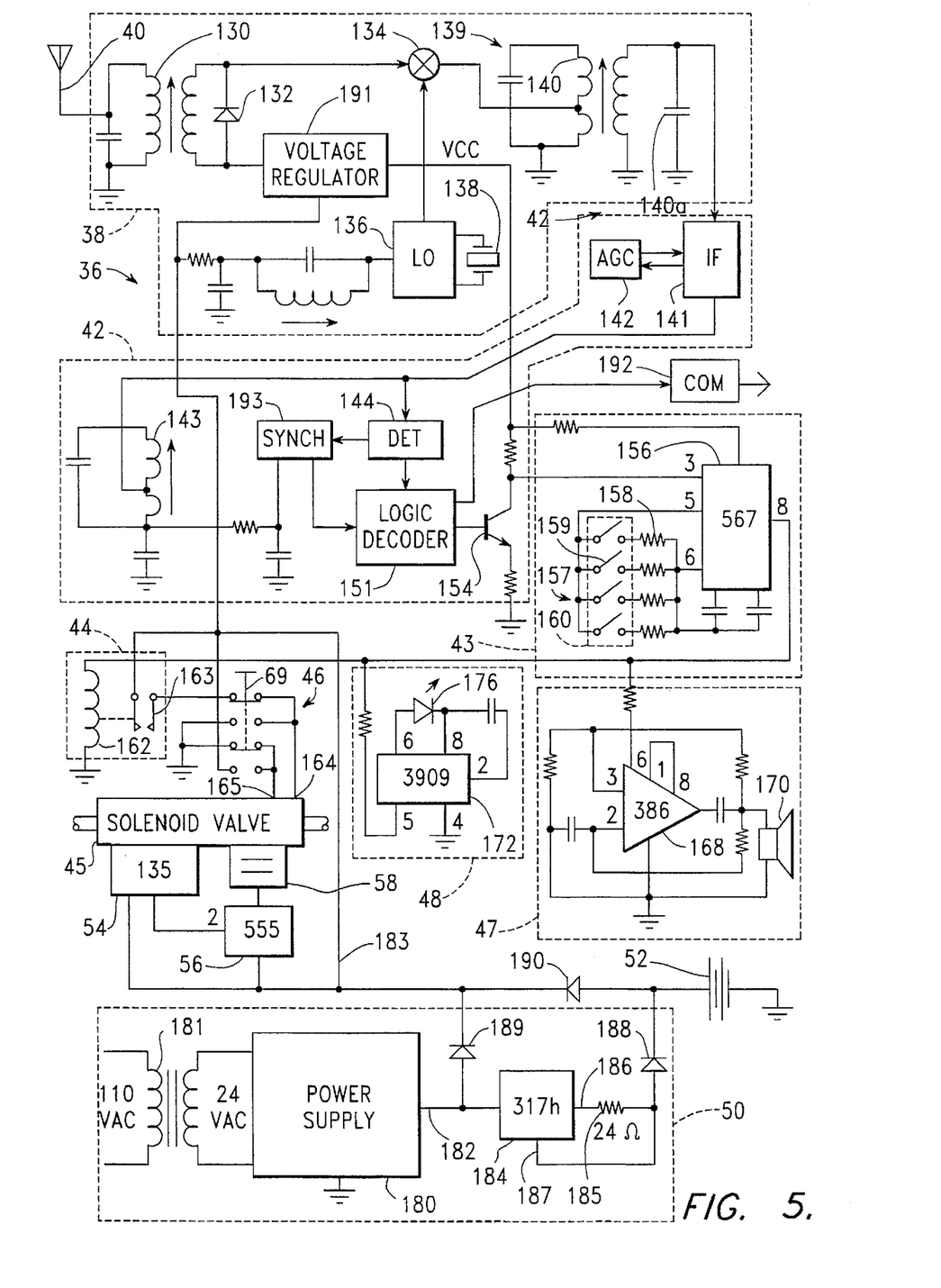
FIG. 5 is a schematic diagram of radio circuits, and circuits to operate a solenoid valve and alarms, within the receiving unit of FIG. 2.

FIG. 5 is a schematic view of the radio circuits, together with circuits to operate a solenoid valve and alarms, within the receiving unit 36. Various circuits forming the superheterodyne receiver and an associated detector and decoder, which are, for example, portions of an LM1872 Radio Control Receiver/Decoder, are shown as parts of a functional block diagram.

A receiving antenna 40 provides an input signal for a superheterodyne receiver including RF (radio-frequency) receiver 38, IF (intermediate frequency) stage 42, and tone decoder 43. The radio-frequency signal, consisting of a carrier signal together with the encoded tone signal, broadcast from an operating transmission unit 10 (shown in FIG. 4), is received by antenna 40 and transmitted through a tuned tank circuit 130 with a shunt diode 132 to a mixer 134. The other input to mixer 134 is a signal at the frequency of local oscillator 136, which is derived from a crystal 138 oscillating at the carrier frequency. This process conditions the signal for use in the intermediate frequency stage 42 of the superheterodyne receiver, as the output of mixer 134 is a signal at 455 kHz, which is still modulated with the encoded tone signal. This configuration is used to improve the detection of low-level signals and to reduce the level of noise, so that the effective range of a transmitting unit 10 is increased without a need to increase its output power. The output signal from mixer 134 is stepped down through a high-Q mixer tank circuit consisting of 455 kHz mixer transformer 139 and a capacitor 140, and is provided as an input to an intermediate frequency filter (IF) 141 in intermediate stage 42. This filter 141 operates with an automatic gain control circuit 142.

The output of IF filter 141 at 455 kHz is provided as an input to IF transformer 143, and to a digital detector 144. The IF transformer 143 sets the overall 3-db bandwidth of the receiver at 3.2 kHz. While this bandwidth is narrow enough to permit operation of nearby systems on adjacent channels, it is wide enough to pass 500 μsec (microsecond) modulation pulses. The digital detector 144, which detects the presence of the encoded tone signal, provides an overall system gain of 88 db, or 30 db more than the gain available using a conventional silicon diode as a detector. The digital detector 144 in turn includes a high-gain precision comparitor, a 30 μsec integrator, and a power supply which is referenced to a 25 mV level (all not shown). If the peak IF signal received as an input by digital detector 144 exceeds 25 mV, the comparator drives a detector transistor to reset the envelope detector capacitor 149, which is ramped a 3-volt level needed to fire a Schmitt trigger within the receiver/decoder in 30 μsec. The presence of the 455 kHz carrier, which has a duration of 2.2 μsec, prevents an envelope detector capacitor from ever reaching the 3-volt threshold. The Schmitt trigger in turn produces a demodulated signal, which is the output of the digital detector. After the carrier drops out, the Schmitt trigger responds in 30 μsec. This delay time is constant over the measurement interval, not effecting the accuracy of timing because a logic decoder 151, which is driven by the output of detector 144, responds only to negative edges of the output signal from detector 144. Logic decoder 151 extracts time information from the carrier to produce an analog output, in the form of a signal driving the base of an output transistor 154. If the LM1872 Radio Control Receiver/Decoder is used to provide the superheterodyne receiver and decoding capabilities, the output of transistor 154 forms the output of the LM1872 integrated circuit.

Tones detected in this manner are used to drive the base of a transistor 154, which in turn provides an input to a phase locked loop (PLL) circuit 156, within tone decoder 43, which is used to verify the presence of a tone frequency which has been pre-determined to identify the output of one of the associated transmitting units 10. This PLL circuit 156 has an internal calibration frequency which has been set at this pre-determined frequency. The internal frequency may be adjusted by adjusting the resistance of a variable resistor 157 consisting of several resistors 158 which may be connected in parallel through the operation of a combination of switches 159 within a DIP switch module 160, which is accessible to the user. If the input frequency from transistor 154 falls within the detection bandwidth of the PLL circuit 156, a signal is provided as the output of PLL circuit 156. If there is no audio frequency input signal from transistor 154, or if this signal is outside the detection bandwidth of the PLL circuit 156, there is no output signal from the PLL circuit 156.

Referring to FIGS. 4 and 5, the variable resistances 89 and 157 are preferably arranged so that, for each possible combination of settings of the switches 92 of variable resistance 89, a visually corresponding combination of settings of the switches 159 of variable resistance 157 provides a detection bandwidth within PLL circuit 156 in the receiver 36 which detects the audio frequency input signal generated by PLL circuit 84 within the transmitter 10.

Referring again to FIG. 5, relay 44 includes a coil 162, which, in the event of flood detection, is activated by the output of PLL circuit 156 to close a set of contacts 163, which in turn apply a positive 9-volt potential to the first electrical input terminal 164 of solenoid valve 45, while an electrical ground potential is applied to the second electrical input terminal 165. This solenoid valve 45 is of a type which is closed by the application of voltage in this way but opened by the application of voltage having the opposite potential. That is, driving electrical current through the electrical input terminals in one direction causes the valve to close when it is open, while driving electrical current through these terminals in the opposite direction causes the valve to open when it is closed. The mechanism of solenoid valve 45 is hi-stable; once it is closed, it remains closed until the appropriate voltage is applied to open it. Similarly, once it is opened, it remains open until the appropriate voltage is applied to close it. This feature prevents dependence on a continuity of electrical power to hold the valve shut. This type of performance is obtained, for example, with a LEGO Part No. SV2-1 actuator and valve from Lego Irrigation of Israel, which is distributed by Water Whiz, Inc of Medley, Fla.

A reset control 46 includes a reset pushbutton switch 69, When the button of this switch 69, is depressed a positive 9-volt potential is applied to second electrical input terminal 165, while an electrical ground potential is applied to first electrical input terminal 164. If the solenoid valve 45 is closed, it is opened by this application of voltage in a polarity opposite that required to close the valve. In this way, solenoid valve 45 is reset, allowing water service to be restored after the conditions causing a water leak are repaired.

In some instances, it is desirable to reset solenoid valve 45 by mechanical means. That is, it may be desirable to restore water service before electrical service is restored, and in the absence of a functional battery. This may be done by turning a manual reset adjustment screw (not shown) on the solenoid valve 45.

The output signal of PLL circuit 156 also drives an audible alarm 47, in which an amplifier 168, which may be, for example, an LM386 audio frequency power amplifier, is used to drive a buzzer 170. Furthermore, the output signal of PLL circuit 156 drives an LED flasher 48, in which an integrated circuit 172, which may be, for example an LM3909 LED flasher/oscillator circuit, drives a blue LED 176.

A preferred version of the receiving unit 36 includes means for preventing a condition in which the solenoid valve 45 becomes stuck open as the water within it freezes. Specifically, a temperature sensor 54, which may be, for example, an LM135 precision temperature or an LM334 temperature sensor/adjustable current source, is placed to measure the temperature of the solenoid valve 45. The output of this sensor 54 drives an input of a timer 56, which may be, for example, an LM555 timer, or an NE555 timer. The output of the timer 56 in turn drives a peltier device 58, which is mounted to the outside of the valve 45. The peltier device 58 heats the valve 45, and hence the water inside it, so that the valve can be shut in the event of a leak caused by a frozen water pipe elsewhere in the system. The operation of timer 56 turns the peltier device 58 on and off in a pre-determined sequence of pulses. When the valve 45 is sufficiently warmed, the output of temperature sensor 54 is terminated, so that timer 56 is shut off until the valve 45 is again cooled to a pre-determined level.

In general, a peltier device uses the peltier effect to provide or remove heat. As electrical current is driven through a junction of dissimilar metals, heat is provided or removed, depending on the direction of current flow. While the preceding discussion assumes the use of a peltier device, an alternate method for converting electrical energy into heat, such as a resistance heating element, may be used to warm the valve 45.

The various components within the receiver 36 are preferably powered either by an AC source at a conventional line voltage, such as 110 volts, and/or by a back-up battery. In the example of FIG. 5, a power supply 180 with an input transformer 181 is used to provide a 9-volt potential at an output terminal 182. Both this output terminal 182 and a rechargeable battery 52 are connected to the various components needing electrical power through a power distribution network 183. When significant current is not needed for such components through network 183, a trickle current for charging battery 52 is provided through a voltage regulator 184, which may be, for example, a 317h. The magnitude of this current is determined by the value of a resistor 185 placed in a circuit between an output line 186 from the voltage regulator 184 and the regulation input 187 of the regulator. For example, resistor 185 is 24 ohms, regulator provided a current of 0.5 mA, which flows into the battery through diode 188.

Various operations occurring in the receiver unit 36 in response to a detected alarm condition, particularly the operation of relay 44 and solenoid valve 45, require much more current than the level of current provided through regulator 184. For this reason a direct path between power supply output terminal 182 and power distribution network 183 is provided through a diode 189. While this diode 189 carries current up to the capabilities of power supply 180, a reverse flow of current into the power supply 180 in the event of a failure of this supply is prevented. A second diode prevents the flow of charging current above the predetermined trickle charging current level between power supply 180 and the battery 52, while allowing the flow of current from battery 52 into the power distribution network 183.

A number of individual circuits within the receiving unit 36 require supply voltages other than +9 volts. These voltages are derived through the use of voltage dropping resistors (not shown) at the power taps (not shown) of the individual circuits. Thus, both the power supply 180 and the battery back-up unit 184 need only to supply power at a positive 9-volt level. A voltage regulator 191 is used to provide a regulated voltage, VCC, needed by certain transistor circuits, from the power supplied on power distribution network 183.

The receiver circuit of FIG. 5 may also be used in connection with another system, such as another safety or fire alarm system, connected to the receiver through a cable attached to a communications port 192. A synchronization timer 192, which is part of the LM1872 Radio Control Receiver/Decoder circuit described above, is provided with inputs from detector 144 and from the end tap of 455 kHz IF transformer 143. The output of synchronization timer 193 is in turn provided as an input to a logic decoder 151, which extracts time information from the carrier to provide a number of analog outputs. Logic decoder 151, which is also a portion of the LM1872 circuit, has features providing for use within and in connection with safety or fire alarm systems.

The core of the decoder 151 is a 3-stage binary counter chain comprising three flip flops. The demodulated output of intermediate frequency filter 141 drives both the counter chain and synchronization timer 193. When the radio frequency carrier signal drops out for the first modulation pulse, the falling edge of the signal advances the timer. During the first modulation pulse, the synchronization timer capacitor is held low. When the carrier signal comes up again for the variable channel interval, the envelope detection capacitor in detector 144 begins to ramp toward the threshold voltage, which it is unable to reach during the short time allowed. At the end of the variable channel interval, the carrier signal drops out again, the counter advances once more, and the sequence is repeated for a second analog channel.

The logic decoder and synchronization circuits of the LM1872 integrated circuit are primarily designed to control the synchronous operation of two analog output channels and two digital output channels. These circuits are used to provide reliable operation of industrial and consumer remote data links, infrared data links, safety alarms, and remotely switched systems. While the communications port 192 is not necessary for the operation of the leak detection system by itself, such a port 192 can optionally be used to provide an interface to various systems as the water leak detection receiver otherwise functions as previously described.

Referring again to FIGS. 2 and 3, while the receiving unit 10 has been described as being housed in a single case with solenoid valve 45, it is understood that a separate housing for radio and logic circuits, connected by electrical wiring to the solenoid valve, can easily be accommodated within the scope of the present invention.

Figure 6:
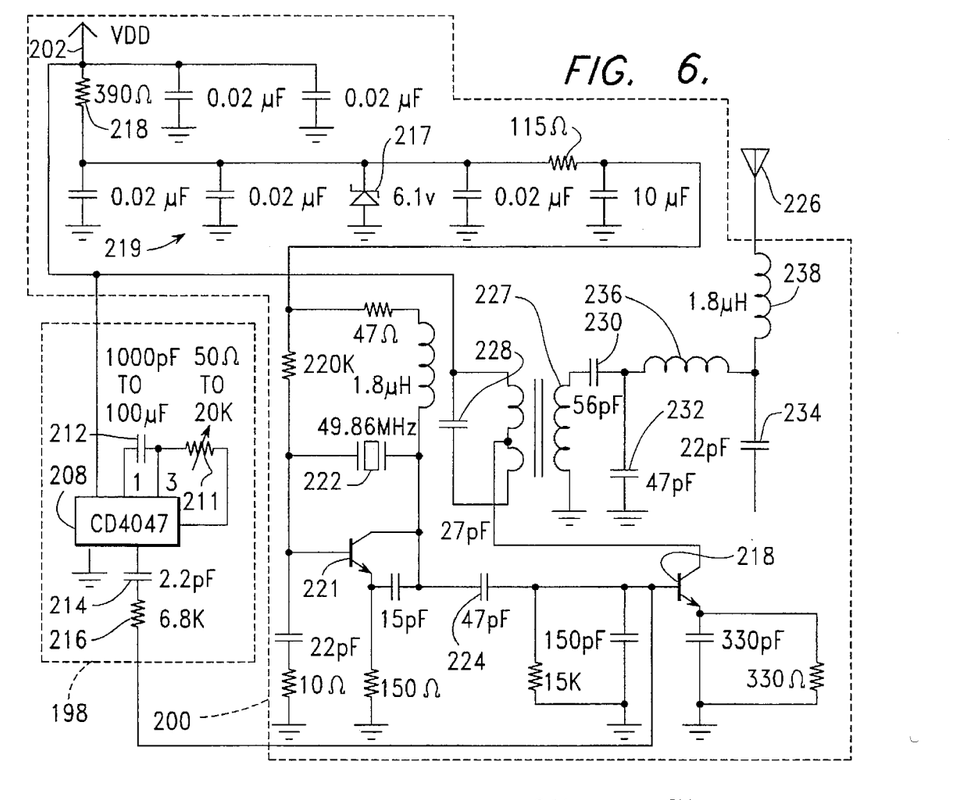
FIG. 6 is a schematic diagram of an alternative tone encoder and radio-frequency output stage for the transmitting unit of FIG. 1.

FIG. 6 is a schematic diagram of an alternative tone encoder 198 and an alternative radio-frequency output stage circuit 200, which replace the tone encoder 20 and RF output stage 18, respectfully, within the transmitter unit 10 (shown in FIG. 1). Other aspects of a transmitter unit using the alternative circuits of FIG. 6 are as previously described in reference to FIGS. 1, 3, and 4. The voltage VDD, which is present as an output of power supply 14 (shown in FIG. 4) when a water leak is detected, is applied to the circuit of FIG. 6 at input terminal 202.

In alternative tone encoder 198, the PLL encoder 84 in the circuit of FIG. 4 is replaced by a CD-4047B CMOS Low-Power Astable Multivibrator 208, which offers particular improvements in the areas of stability, ease of frequency selection, and low power consumption, for producing the tone signal. In the configuration of FIG. 6, the multivibrator 208 can operate with variations in input voltage from 3 to 18 volts. Electrical ground is applied to pins 8, 9, and 12, and the input voltage VDD is applied to pins 5, 6, and 14, of multivibrator 208, which is configured as a monostable multivibrator with a 50-percent duty cycle. The tone frequency is determined by the settings of a potentiometer 211, which is varied between 50 and 20,000 ohms, and by the value of a capacitor 212, which may be between 1,000 pF and 100 μF. While a potentiometer 211 is shown, the resistance indicated by this potentiometer may be varied by switching a combination of resistors using a DIP switch module, in the manner described for resistance 89 (shown in FIG. 4). Similarly, while a fixed capacitor 212 is shown, the capacitance represented by this capacitor may be varied by switching a combination of capacitors using a second DIP switch module in the same manner. The output from pin 13 of multivibrator 208 is fed into the input of a transmitter output stage 200, through a coupling capacitor 214 an a resistor 216, into the base of an amplifier transistor 218, which may be, for example, an SK3452 NPN Silicon transistor.

The input voltage VDD supplied to radio-frequency output stage circuit 200 is regulated using a 6.1-volt zener diode 217, together with a resistor 218. Decoupling capacitors 219 to electrical ground are also placed in several locations along the line 220 through which the input voltage is brought into RF output stage 200. Within this stage, an oscillator transistor 221, which may be, for example, a 91018/SK3452 transistor, is used to produce the radio-frequency carrier signal. A crystal oscillator 222 is placed between the collector and base terminals of oscillator transistor 221, so that the transistor oscillates at the frequency of the crystal selected, in this example at 49.86 MHz, using a well-known positive feedback method. The RF output signal from oscillator transistor 221 is coupled through a capacitor 224 to the base of amplifier transistor 218, which may be, for example, a 9018H/SK transistor. The output from pin 13 of multivibrator 208 is also coupled to the base of amplifier transistor 218, through capacitor 214

Since both the outputs of multivibrator 208 and of oscillator transistor 221 are capacitively coupled to the base of amplifier transistor 218, the signal driving this transistor 218 is the carrier signal modulated by the superimposed tone signal from multivibrator 208. The output of amplifier 218 is coupled to an antenna 226 through a tuned tank circuit including a transformer 227 and a capacitor 228, and through a filter circuit including capacitors 230, 232, and 234, and inductors 236 and 238. While the inductance of inductor 236 is not shown, this indictor is composed of a coil having 10.5 turns. Thus, the radio-frequency carrier signal modulated by the encoded tone signal are carried to the antenna 226 for radiation into the atmosphere.

Figure 7:
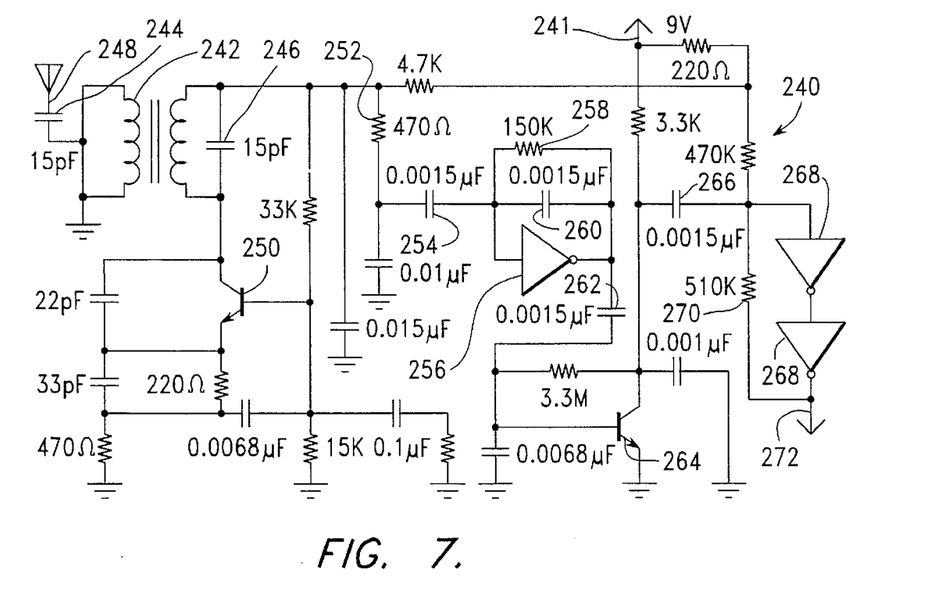
FIG. 7 is a schematic diagram of an alternative radio-frequency receiver and detector for the receiving unit of FIG. 2.

FIG. 7 is a schematic diagram of a super-regenerative receiver and detector circuit 240, which replaces the super-heterodyne radio-frequency receiver circuit 38 IF stage 42, previously described in reference to FIG. 5. Thus, the LM1872 Radio Control Receiver/Decoder integrated circuit and associated circuits, previously described in reference to FIG. 5, are replaced, with other aspects of the receiver remaining as described in reference to FIGS. 2, 3, and 5. In general, in a regenerative detector, the signal is regenerated by positive feedback between the input and output signals. In a regenerative receiver, controlled regeneration is used to increase the amplification provided by the detector stage.

A regulated voltage at a 9-volt level, from the power distribution network 183 (shown in FIG. 5), is supplied to the receiver and detector circuit 240 at input 241 a tuned input tank circuit composed of transformer 242 and of capacitors 244 and 246 couple an antenna 248 with a buffer amplifier transistor 250 forming a buffer stage of a super-regenerative detector. This transistor 250 may be, for example, a 9011G NPN silicon transistor. From this buffer stage, a buffered signal including carrier and encoded tone components is fed through an RC coupling circuit including resistor 252 and capacitor 254 to provide an input to a first stage amplifier 256. This first stage amplifier 256 may be, for example, a portion of a CD4069 CMOS Hex Inverter/High Input Impedance Amplifier. An external circuit comprising a resistor 258 and a capacitor 260 provides negative feedback between the output and input of first stage amplifier 256, limiting the bandwidth of the circuit while its overall gain stability. Thus, first stage amplifier circuit 256, together with resistor 258 and capacitor 260, form an active detector stage, amplifying and passing to the next stage, only signal frequencies within the passband of the detector, which includes the frequency of encoded tone signals. In this way, the radio-frequency carrier signal is eliminated.

The output of first stage amplifier 258 is fed through a coupling capacitor 262 to drive the base of a second stage amplifier transistor 264. Like buffer transistor 250, this amplifier transistor 264 may be, for example, a 9011C NPN silicon transistor. This second amplifier stage provides additional amplification and filtering. The output of amplifier transistor 264 is fed through a coupling capacitor 266 to a pair of amplifiers 268 which form the final stage of regenerative amplification in the receiver circuit. Like amplifier 256, each amplifier 268 may be, for example, a portion of a CD4069 CMOS Hex Inverter/High Input Impedance Amplifier, to which the regulated voltage, VCC is applied at pin 14 (not shown). Regenerative, positive feedback is provided through a resistor 270. The output of this final stage at line 272 is provided as an input to PLL circuit 156 (shown in FIG. 5) in which the presence of the encoded tone signal is determined as previously explained in reference to FIG. 5.

While the invention has been described in its preferred forms or embodiments with some degree of particularity, it is understood that this description has been given only by way of example and that numerous changes in the details of construction, fabrication and use, including the combination and arrangement of parts, may be made without departing from the spirit and scope of the invention.

What is claimed is:

1. A cordless leak detection transmitter comprising:
 a housing;
 a battery with first and second battery terminals within said housing; first and second electrodes extending from said housing, wherein said first battery terminal, wherein said first and second electrodes are adjacently disposed to provide electrical conductivity therebetween in the, presence of a partially conductive fluid extending therebetween; and
 a radio-frequency transmitter within said housing, wherein said radio-frequency transmitter is caused to transmit an encoded signal through a surrounding atmospheric space in response to an electrical potential established between said second electrode and said second battery terminal,
 and wherein electrical power for operation of said radio-frequency transmitter is derived solely from said battery,
 message storage means, within said housing, for storing an audio message recorded from an audible input as a first switch is operated; and
 message play means, within said housing, for playing back said audio message in an audible manner, wherein said message playback means is caused to operate in response to said electrical potential established between said second electrode and said second battery terminal, and wherein said message playback means is additionally caused to operate as a second switch is operated,
 audible alarm means, within said housing, for producing a non-verbal alarm signal; and
 audio output timing means for operating said message playback means and said audible alarm means in an alternating pattern in response to said electrical potential established between said second electrode and said second battery terminal.

2. The leak detection transmitter of claim 1, wherein electrical power necessary for operation of said radio-frequency transmitter is derived from said electrical potential established between said second electrode and said second battery terminal only when said partially conductive fluid has accumulated to an extent causing electrical conduction between said first and second electrodes.

3. The leak detection transmitter of claim 1:
 wherein said message storage means comprises means for digitally recording a message in electronic memory; and
 wherein said message playback means includes means for audibly reproducing said message stored in said electronic memory.

4. The leak detection transmitter of claim 1, wherein said message playback means additionally plays back said audio message as a second switch is operated.

5. The leak detection transmitter of claim 1, comprising additionally visual indication means for flashing a light emitting diode, wherein said visual indication means is caused to operate in response to said electrical potential established between said second electrode and said second battery terminal.

6. The leak detection transmitter of claim 1, comprising additionally a low battery alarm flashing a light emitting diode when a voltage provided at a terminal of said battery falls below a pre-determined level.

7. The leak detection transmitter of claim 1, wherein said radio-frequency transmitter includes:
 carrier frequency signal generating means for generating a radio-frequency signal;
 tone frequency signal generating means for generating an audio-frequency signal; and
 modulation means for modulating said radio-frequency signal with said audio-frequency signal.

8. The leak detection transmitter of claim 1, wherein said radio-frequency transmitter includes:
 a phase-locked loop generating a tone signal in response to said electrical potential established between said second electrode and said second battery terminal; and
 a radio-frequency amplifier operating in response to said electrical potential established between said second electrode and said second battery terminal, wherein said radio-frequency amplifier is coupled to an output of said phase-locked loop and to a tank circuit oscillating at a carrier frequency.

9. The leak detection transmitter of claim 1, wherein said radio-frequency transmitter includes:
 a multivibrator generating a tone signal in response to said electrical potential established between said second electrode and said second battery terminal; and
 a radio-frequency transmitter circuit operating in response to said electrical potential established between said second electrode and said second battery terminal, wherein said radio-frequency transmitter circuit includes an oscillator amplifier driven at a carrier frequency by a crystal oscillator and a transmission signal amplifier to which outputs of said multivibrator and said oscillator amplifier are coupled.

10. A cordless leak detection transmitter comprising:

a housing;

a battery with first and second battery terminals within said housing; first and second electrodes extending from said housing, wherein said first battery terminal, wherein said first and second electrodes are adjacently disposed to provide electrical conductivity therebetween in the presence of a partially conductive fluid extending therebetween; and a radio-frequency transmitter within said housing, wherein said radio-frequency transmitter is caused to transmit an encoded signal through a surrounding atmospheric space in response to an electrical potential established between said second electrode and said second battery terminal, and wherein electrical power for operation of said radio-frequency transmitter is derived solely from said battery, message storage means, within said housing, for storing an audio message recorded from an audible input as a first switch is operated;

an audio output timer producing a train of intermediate signal pulses in response to said electrical potential established between said second electrode and said second batter terminal;

message playback means, within said housing, for playing back said audio message in an audible manner, in response to each of said intermediate signal pulses, wherein said message playback means produces an end of message signal at the end of each said audio message; and audible alarm means, within said housing, for producing a non-verbal alarm signal in response to each said end of message signal.

11. A leak detection receiver comprising:

receiving means for receiving a radio signal from a surrounding atmospheric space, wherein said receiving means provides an intermediate signal derived from said radio signal;

decoding means for determining characteristics of said intermediate signal, wherein said decoding means produces a first decoded output when certain characteristics of said intermediate signal are met;

a valve operating in response to said first decoded output to shut off water flow;

temperature sensing means for sensing a temperature at said valve, wherein said temperature sensing means provides a temperature output signal as said temperature at said valve approaches a freezing condition; and heating means for heating said valve in response to said temperature output signal.

12. The leak detection receiver of claim 1, wherein said heating means comprises:

a timing circuit operating in response to said temperature output signal; and a peltier device driven by said timing circuit, being alternately turned off and on thereby, wherein heat is conducted to said valve from said peltier device.

13. A leak detection system comprising:

a plurality of cordless leak detection transmitters, wherein each said leak detection transmitter includes a battery, leak detection means for detecting a nearby water leak, with said detection means providing a first intermediate signal upon detection of said nearby water leak, message storage means for storing an individual audio message, message playback means for playing back said audio message in an audible manner in response to said first intermediate signal, and transmission means for transmitting a radio-frequency alarm signal through an ambient atmospheric space in response to said first intermediate signal, wherein electrical power for operation of said transmission means is derived solely from said battery;

a leak detection receiver including receiving means for receiving said radio-frequency alarm signal through said ambient atmospheric space from each of said leak detection transmitters, with said receiving means providing a second intermediate signal upon reception of said radio-frequency alarm signal, and a valve operating in response to said second intermediate signal to shut off water flow;

said leak detection receiver additionally includes decoding means, with a phase-locked loop providing an output signal in response to an input signal occurring at a predetermined tone frequency, for determining characteristics of said second intermediate signal, wherein said decoding means produces a first decoded output when predetermined characteristics of said intermediate signal are met, with said valve operating in response to said first decoded output to shut off said water flow.

14. The leak detection system of claim 13:

wherein said battery has first and second terminals within said leak detection transmitter and first and second electrodes extending from a housing of said leak detection transmitter, with said first and second electrodes being adjacently disposed to provide electrical conductivity therebetween only in the presence of a partially conductive fluid extending therebetween, with said first terminal of said battery electrically connected to a first of said electrodes; and wherein said first intermediate signal is derived at said second electrode.

15. The leak detection system of claim 13, wherein said receiving means includes a superheterodyne radio-frequency receiver.

16. The leak detection system of claim 13, wherein said receiving means includes a super-regenerative radio-frequency receiver and detector.

17. The leak detection system of claim 14, wherein said leak detection receiver additionally includes:

an audible alarm operating in response to said second intermediate signal; and visual alarm means flashing a light emitting diode in response to said second intermediate signal.

18. The leak detection system of claim 13, wherein said leak detection receiver additionally includes:

temperature sensing means for sensing a temperature at said valve, wherein said temperature sensing means provides a temperature output signal as said temperature at said valve approaches a freezing condition; and heating means for heating said valve in response to said temperature output signal.

19. The leak detection system of claim 16, wherein said super-regenerative radio-frequency receiver and detector includes:

a receiving antenna;

an input tank circuit coupled to said receiving antenna;

a buffer stage having an input coupled to said input tank circuit;

a first amplifier stage having an input coupled to an output of said buffer stage and to a negative feedback loop from an output of said first amplifier stage; and a output amplifier stage having an input coupled to an output of said first amplifier stage and to a positive feedback loop from an output of said output amplifier stage.

20. A leak detection system comprising:

a plurality of cordless leak detection transmitters, wherein each said leak detection transmitter includes a battery, leak detection means for detecting a nearby water leak, with said detection means providing a first intermediate signal upon detection of said nearby water leak, message storage means for storing an individual audio message, message playback means for playing back said audio message in an audible manner in response to said first intermediate signal, and transmission means for transmitting a radio-frequency alarm signal through an ambient atmospheric space an response to said first intermediate signal, wherein electrical power for operation of said transmission means is derived solely from said battery;

a leak detection receiver including receiving means for receiving said radio-frequency alarm signal through said ambient atmospheric space from each of said leak detection transmitters, with said receiving means providing a second intermediate signal upon reception of said radio-frequency alarm signal, and a valve operating in response to said second intermediate signal to shut off water flow;

means for digitally recording a message in electronic memory;

said message playback means includes means for audibly reproducing said message stored in said electronic memory; and audible alarm means for producing a non-verbal alarm signal; and audio switching means for causing alternating operation of said message playback means and said audible alarm means.

21. A leak detection system comprising:

a plurality of cordless leak detection transmitters, wherein each said leak detection transmitter includes a battery, leak detection means for detecting a nearby water leak, with said detection means providing a first intermediate signal upon detection of said nearby water leak, message storage means for storing an individual audio message, message playback means for playing back said audio message in an audible manner in response to said first intermediate signal, and transmission means for transmitting a radio-frequency alarm signal through an ambient atmospheric space in response to said first intermediate signal, wherein electrical power for operation of said transmission means is derived solely from said battery;

a leak detection receiver including receiving means for receiving said radio-frequency alarm signal through said ambient atmospheric space from each of said leak detection transmitters, with said receiving means providing a second intermediate signal upon reception of said radio-frequency alarm signal, and a valve operating in response to said second intermediate signal to shut off water flow;

a super-regenerative radio-frequency receiver and detector including:

a receiving antenna;

an input tank circuit coupled to said receiving antenna;

a buffer stage having an input coupled to said input tank circuit;

a first amplifier stage having an input coupled to an output of said buffer stage and to a negative feedback loop from an output of said first amplifier stage; and an output amplifier stage having an input of said first amplifier stage and to a positive feedback loop from an output of said output amplifier stage.

* * * * *